Patented Aug. 28, 1934

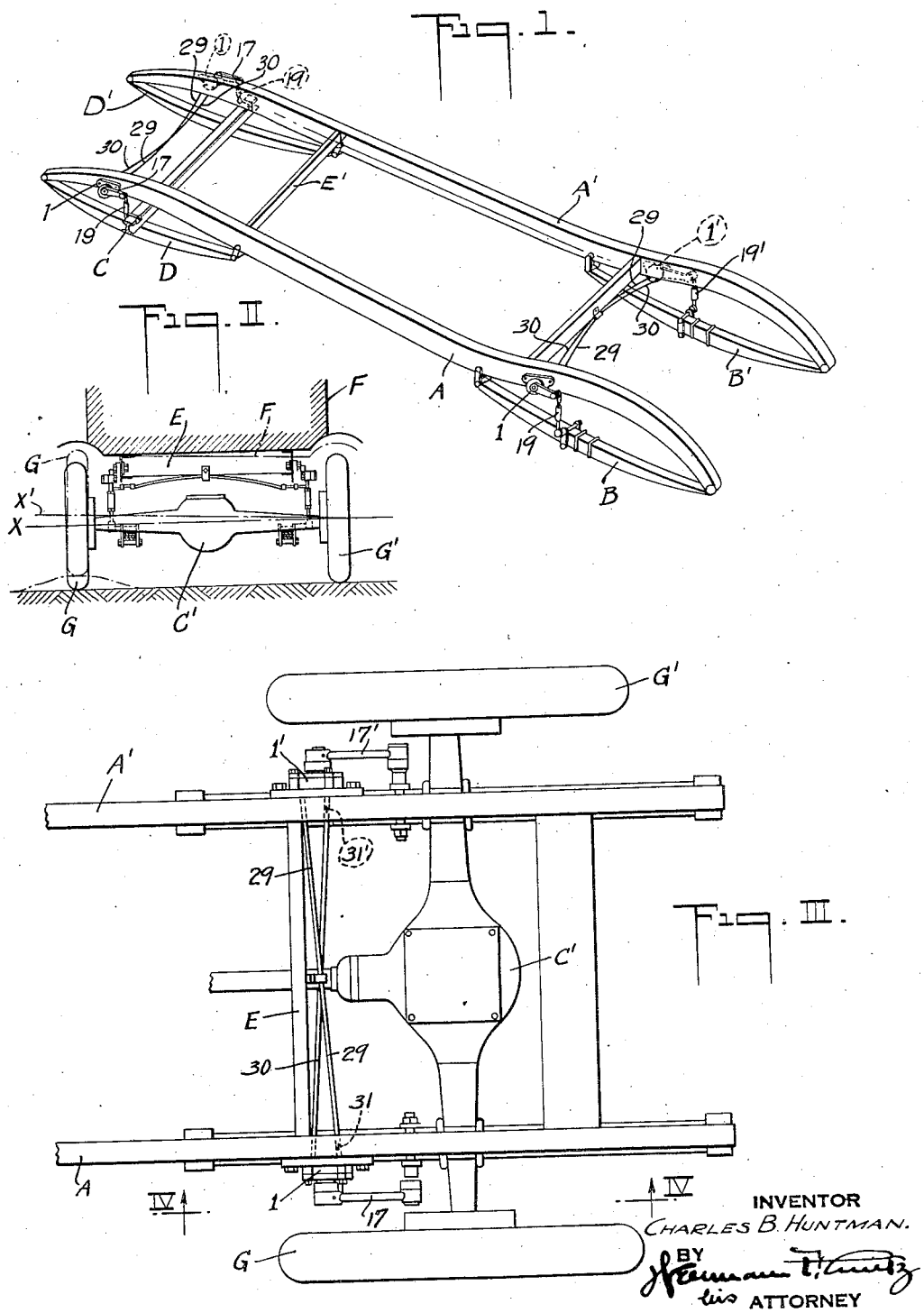

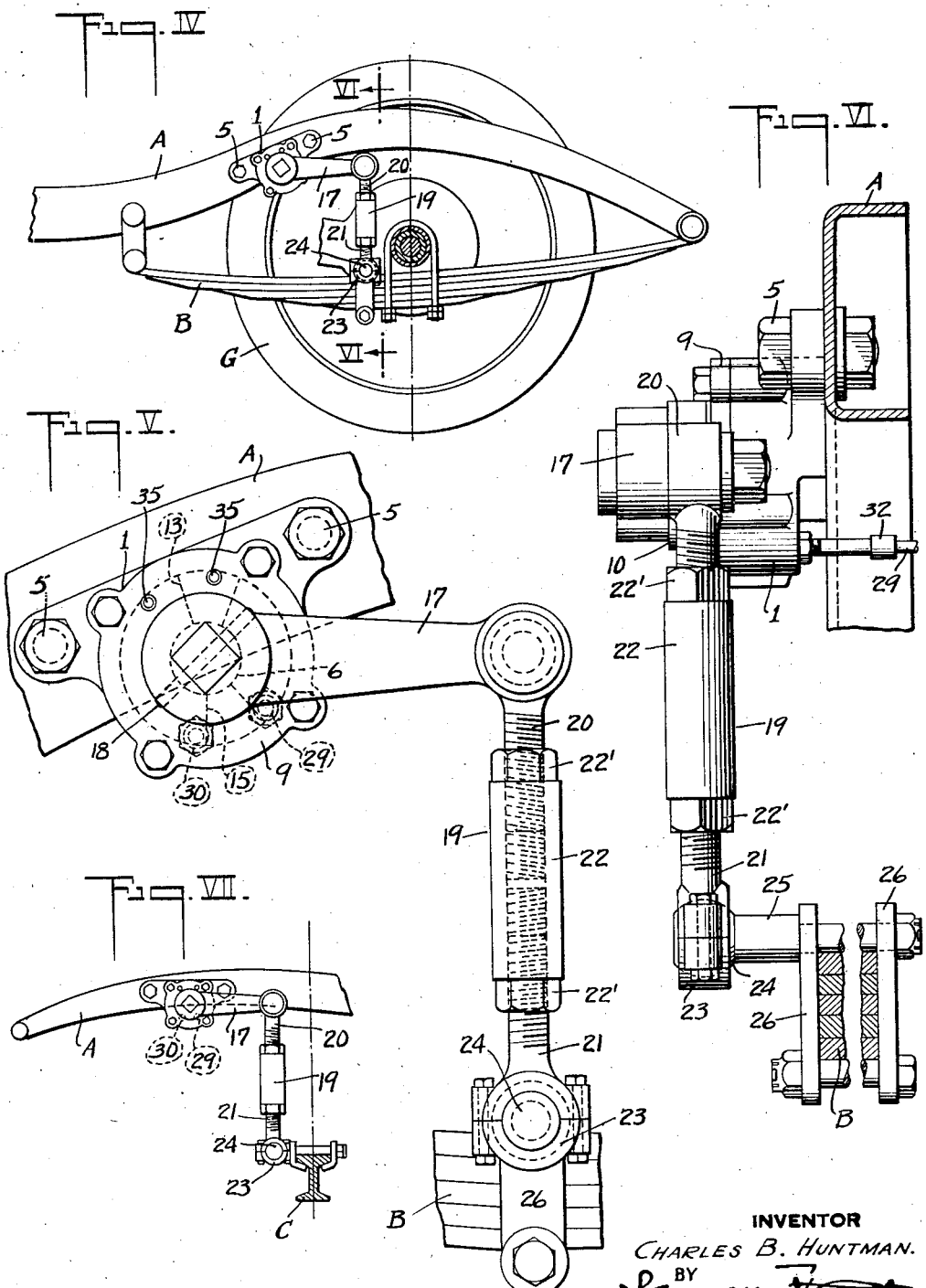

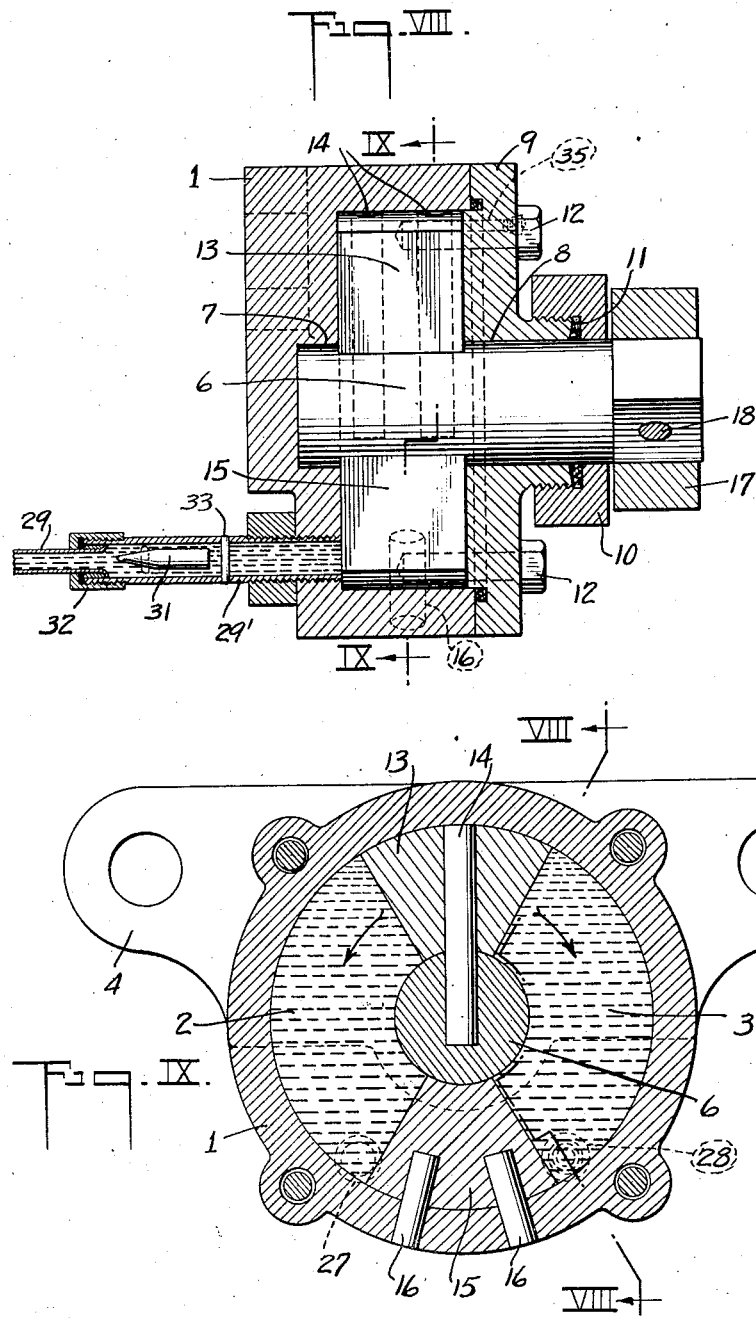

1,971,958

UNITED STATES PATENT OFFICE 1,971,958

METHOD OF STABILIZING AUTOMOBILES WHILE IN MOTION

Charles B. Huntman, Plainfield, N. J., assignor to Huntman Stabilizer Corporation Original application August 24, 1925, Serial No. 51,908. Divided and this application May 1, 1934, Serial No. 723,301

3 Claims. (Cl. 267—11)

This application is a division of my original application filed August 24, 1925, Serial No. 51,908, which has been allowed—December 1, 1933.

The invention relates to the equalizing or balancing of shocks such as are involved in motor cars when wheels on one side are displaced by the uneven contour of the road, or when the centrifugal strain tends to careen the body when a car at speed is deflecting its course. My invention deals with the method of absorbing such shocks or strains, balancing the effect of the strains on both sides of the car, dampening the reaction of any wheel or body displacement due to such shocks, and various other advantages which will appear from a more detailed description hereinafter set forth.

Heretofore and at the time of my original application, devices were known for use in connection with each individual wheel as self-contained frictional or like shock-absorbing means, each device functioning solely in conjunction with the displacement of a specific wheel on one side of the car.

My invention involves the transmission of the shock and consequent relative movement of the wheel with respect to the frame on one side of the car to a device on the opposite side of the car where the relative position of regular suspension maintaining the axle and frame absorb or resist the action on the opposite side, and, furthermore, to interconnect both sides of the car as to the suspension of axle or wheels in such a manner that the displacement on either side by uneven road surface will encounter reaction by the regular axle suspension on the opposite side, and thereafter will dampen the return movement of the displaced parts on both sides. Furthermore, accomplishing a similar result when the relative displacement due to the tendency of the body or the super-load on a chassis to cause uneven deflection of axle-carrying springs on opposite sides, due to the centrifugal force when speeding around curves or the like. Many variations in the apparatus may be made to practice this method of laterally stabilizing shock-absorbing in vehicles. To clearly set forth the invention it will now be described in a single form of embodiment in a usual type of motor car chassis, while the mechanism and functioning would of course be varied when the invention is embodied in the various other ways, for example, dependent upon the desired positioning of parts for convenience of design, or otherwise, many forms of the embodiment of my invention having been made by me prior to the filing of my original application.

A particular embodiment of my invention is illustrated in the accompanying drawings, in which:

Fig. I is a perspective of parts of a chassis showing the equalizer connections between springs or axle to the sills and their interconnection between the sides.

Fig. II is a rear view diagrammatic, for use in explaining the section of the equalizer.

Fig. III is a plan view on a larger scale of the rear end of a chassis embodying the equalizer mechanism.

Fig. IV is a side elevation, in section IV—IV of Fig. III.

Fig. V is a fragmentary side elevation of the shock-transmitting linkage on one side, on a larger scale.

Fig. VI is a section on line VI—VI of Fig. IV, showing the shock-transmitting linkage on the same scale as Fig. V, in end view.

Fig. VII is a side elevation of the shock-absorbing linkage interconnecting sill and axle, on a smaller scale.

Fig. VIII is an approximate vertical section of the shock-absorbing chamber on line VIII—VIII of Fig. IX.

Fig. IX is a vertical section longitudinal of the car of the shock-absorbing element on line IX—IX of Fig. VIII.

The one form selected, upon the filing of my original application to illustrate my invention, is shown in the accompanying drawings, and is one of various forms of my invention previously reduced to practice, and in the particular form herein shown has the sills A—A' of a chassis with rear springs B—B', front axle C and front springs D—D', and frame members E connecting the sills in the rear and E' in the front with a superposed body F, rear axle C', and wheels G—G'.

The shock-absorbing elements and linkage interconnecting the sills or body with axle ends and the equalizing interconnection between shock-absorbing mechanism on each side of the vehicle, involve the casing 1 having oil chambers 2 and 3, with a preferably integral base 4 constituting means for securing this part as by bolts 5—5 to the sills A—A' of the chassis. An oscillating shaft 6 is mounted in bearing 7 in the casing 1 and bearing 8 in a casing-cover 9 having a packing gland 10 to form an oil-tight joint, as by packing 11 around the shaft 6 to hold the oil in the chambers 2 and 3, while bolts 12 securely hold the cover 9 to the casing. A reciprocating piston 13 is secured by dowels 14 to the shaft 6, while an abutment 15 fitting the interior of the chamber 3 is secured by dowels 16 to the interior wall of the casing 1. This piston and abutment extend preferably about thirty degrees around the shaft, and in the initial or normal position the piston 13 is diametrically opposite the abutment 15, thereby leaving on each side about one hundred and twenty degrees of space in the form of a segmentary chamber which is adapted to confine oil or other like fluid transmission medium such as is used in gun recoil cylinders, or fluid-power mechanism preferably non-freezing mixtures, such as alcohol with castor oil or glycerine, or medium body lubricating oil. The linkage to transmit shock by relative movement of spring or axle with respect to the sills, comprises the crank arm 17 on the left side and crank 17' on the right side, each of these arms or levers having a hub adapted to fit the end shaft 6 and to turn therewith in view of a squared connection or other suitable means of rigid attachment and suitably secured as by pin 18, while an adjustable link 19 has threaded pivot stubs 20 and 21, with interconnecting sleeve 22 and lock nuts 22' similar to a turn-buckle, and pivot stub 21 has preferably a split bearing 23 adapted to engage a part spherical end 24 on the stud 25 formed for convenient attachment like clamps 26 to the spring such as B, in a position at a part of the spring approximating major deflection by shock of uneven roads practically equaling the entire displacement of axle end and wheel.

In the oil chambers 2 and 3 the sluggish medium such as oil, is completely confined by the piston 13 and the abutment 15 and the shaft 6 and the inner walls of the casing and cover,—with the essential exception of a vent or hole 27 in chamber 2, and 28 in chamber 3 adjacent the angle formed by the wall of the abutment with the inner wall of the casing, which vents register respectively with pipes 29 and 30 leading respectively from the rear of the casing 1 on the left side of the chassis, as shown, and the forward side of the abutment, but these pipes are transposed or crossed so that pipe 29 leads to the forward side of the abutment, and therefore to chamber 2' in the casing 1' on the righthand side of the chassis, while the pipe 30 leads to the rear chamber 3' in the casing 1' on the righthand side of the chassis,—when the shock-transmitting crank 17 extends rearwardly from the casing on both sides.

Close to the junction of these pipes with the casing, one of the pipes on each side preferably has a one-way check comprising a float 31 with a reduced end adapted to reduce the flow section in a restricted passage 32, when the point of the float 31 is driven by the oil flow into the restricted passage 32, but when driven in the opposite direction with the float engaging a stop 33, the free-flow of the oil or like transmission fluid is permitted. This one-way fluid-retarding-valve is built into the connection of tube 29, in the case of the arrangement as illustrated in Figs. I, III and IV, on the left side of the chassis, and a like fluid-flow-varying-valve is built into the end of pipe 30 on the righthand side of the car, for reasons of functioning, which will hereinafter be described.

It will thus be seen that the mechanism as described in detail will operate in the following manner: When a chassis, as partly illustrated in Fig. III, is moving over a road, should the wheel G strike an obstruction and be raised, at the same time through link 19 the lever 17 is rocked upward with the compression of spring B toward the sill A. This movement of the lever drives the oil in chamber 2 freely through the pipe 30 into the chamber 3' in the casing 1', and forces the lever 17' upwards, all on the opposite side of the vehicle, in other words, giving the same angular direction of rotary reciprocation to the lever on the opposite side of the vehicle, thereby tending to draw the spring B' toward the sill A', and the resistance on this opposite side is the shock-absorbing resistance to the tendency of deflection due to an obstruction on the other side, and vice versa. The moment the wheel G has passed over the obstruction, the reverse tendency becomes effective, namely, lever 17 drops with the drop of the axle and spring B, and the piston 13 being oscillated back toward its normal or initial position tends to drive the oil chamber 3 through the hole 28 and the pipe 29, but the check-valve 31 is instantly floated into the position restricting the free flow of oil, and thereby it dampens the return action of the piston and the return action of the lever 17, while at the same time on the opposite side of the car the tendency of lever 17' to return is checked by the floating-valve in the tube 30 close to its connection with the chamber 3'.

While the shock due to displacement of a wheel on one side is thus absorbed or retarded by the functioning of the mechanism on the opposite side, any slight movement on the opposite side tends to relatively pull up the axle toward the body or superstructure of the chassis, but when the obstruction is passed the reaction is immediate and this pulling up on the opposite side anticipates the recoil of the spring and its effect on the obstructed side with the consequent result that with the immediate resumption of motion over the road surface equally level on both sides, the compensation of action interconnected from side-to-side has a net result of preventing the rocking of the body, and this effect is by anticipating the respective reactions and dampening the vibration of the springs relative to the sills and dampening the tendency to lateral motion or rocking of the mass or the main weight on the sills such as body or load. Thus instead of the mass of the vehicle tending with its inertia against vertical motion, simply to resist the upward movement of one wheel, the interconnection from side-to-side of my mechanism utilizes the inertia of the mass of the body against lateral rocking. While in effect this tends to equalize the motion of the opposite axle ends from a normal horizontal, it entirely equalizes the effect upon the mass of the body on the respective sides, thereby preventing the actual rocking of the body on the line of direction of motion, and, furthermore, by the equalizing of the effects of rough roads or centrifugal force on turns, it prevents any cumulative vibrating motion of the body and quickly deadens or dampens the displacement of the body so that the general effect becomes one of perfectly easy riding.

In the diagrammatic view Fig. II, the above will be understood in explanation of the action when a wheel on one side rises over an obstruction. The momentary displacement of the axis from X to X' causes by my equalizer a tendency as shown in dash-dot line on the right side of Fig. II to depress the body on the opposite side but it actually raises the axle on the other side a little freer from the ground, but before any such effect is felt in the body, the obstruction having been passed, the recoil reverses that action, and in view of the time-element involved in the functioning of the mechanism the net result is a practical complete stabilizing of the motion of the body with the forward motion of the car at all reasonable speeds of operation. For example, in the case of any substantial speed for a given car the mass of the body moving in a straight course substantially horizontal, has great resistance to deflection compared with the relatively light weight of the wheel and the axle end, so that in practice at such speeds no actual motion of the body is felt, but the shock-absorbing accomplished for one side by the mechanism on the other involves the spring resistance, and any such strain to compress the spring and draw it nearer the sill simply tends to relieve the pressure of that wheel on the ground without deflecting the body at such speeds from its straight course.

Besides the inherent very remarkable qualities of this mechanism for comfort in riding, there is a great reduction in the strain on the parts and a saving in wear and tear, and in the practical development of the invention it has been found that the easy riding and other advantages can be greatly improved and realized by my mechanism with curtailing some of the other devices that have heretofore been added with added cost and expense in the futile attempt to accomplish these results. The reduction in the number of spring leaves, the discarding entirely of supplementary spring members, or rubber buffers, are only a few of the features which may here be mentioned.

It will be noted, furthermore, that when a chassis is laterally unequally loaded, even when at rest, the depression on one side cannot exist without a compensating depression of the spring on the other side, and the only slight effective depression is due to tire contact depression. In the case of the recent adaptation of relatively large diameter tires with much lower air pressure as one-third of that previously used, there has been a greater tendency to body motion, and in that connection it has been found that my invention equalizes, absorbs and stabilizes the bodies of cars in use at speeds which offset the stated defect that has been noted with the larger and lower-pressure tires.

It will be understood that the transmission of the effect on one side to the complementary mechanism on the opposite side may be effected by means of a direct piston action from the spring near the axle, or directly from the axle, and many other variations may be made in the mechanism to fit particular designs and arrangement of the parts of a car or running gear, and the dimensions of linkage or connections will be varied to suit the particular type and weight of car and to suit the particular normal speeds of usage. In the example herein particularly described, the mechanism is designed and functions with all of the stated advantages by having the linkage and the size of oil chamber and piston, as well as the size of interconnecting tubing and check-valve, all substantially as illustrated as to their relative dimensions. Variations in relative dimensions may conform thereto, and will, however be modified in practice for the particular case, and the material and detailed design of parts for the necessary strength, durability and rigidity while satisfactory in the form shown may be varied without departing from my invention.

This equalizing mechanism as shown and described, may be made complete and attached to existing cars, and in so doing may displace various other fitments now thought necessary, and not alone accomplish the shock-absorbing in old types of individual wheel devices, but provides as hereinbefore set forth those and many other advantages not heretofore realizable by any mechanism previously used or known. When made for embodiment in the original construction of cars it may be simplified in weight of material and workmanship, and the essential parts may be more suitably protected or embodied for more equal transmission of strains to sill, axle or wheels, without departing from the spirit of my invention.

What I claim and desire to secure by Letters Patent is:

1. A method of counteracting the lateral rocking tendency of the body or superposed load of a vehicle due to unequal vertical displacing force on the wheels or body on opposite sides during travel, having spring connections on each side interconnecting the wheels with the body or sill, consisting of transmitting the force of relative displacement of the wheel and the body or superposed load on one side freely from that side to give an equal displacement to the wheel on the opposite side whereby the spring connection between wheel and body on the opposite side affords the main resistance to such latter displacement, and thereafter damping equally on both sides the return reactions of the springs.

2. A method for ride-stabilizing of power driven vehicles moving at speed on common roads having a preponderant sprung mass as compared with the unsprung mass of the road wheel structure, consisting of transmitting the depressing force on one side as component of the centrifugal force of the sprung mass when rounding a curve in a manner to equally depress the opposite side of the sprung mass and maintain the plane of the sprung mass substantially in parallelism with the common axis of a pair of road wheels thereunder, and thereafter when the vehicle resumes a straight course dampening equally on both sides the relative rise of the sprung mass.

3. The method of stabilizing a road vehicle having sprung and unsprung masses when in motion entering, proceeding through, and departing from an arc of travel which consists of maintaining the sprung mass on an even keel, lowering the center of gravity of the sprung mass while proceeding through the arc of travel, damping the reaction of the sprung mass upon the rise of the center of gravity upon departing from the arc of travel, whereby the tendency of the entire vehicle to upset due to centrifugal force is reduced.

CHARLES B. HUNTMAN.